United States Patent Office 3,446,030
Patented May 27, 1969

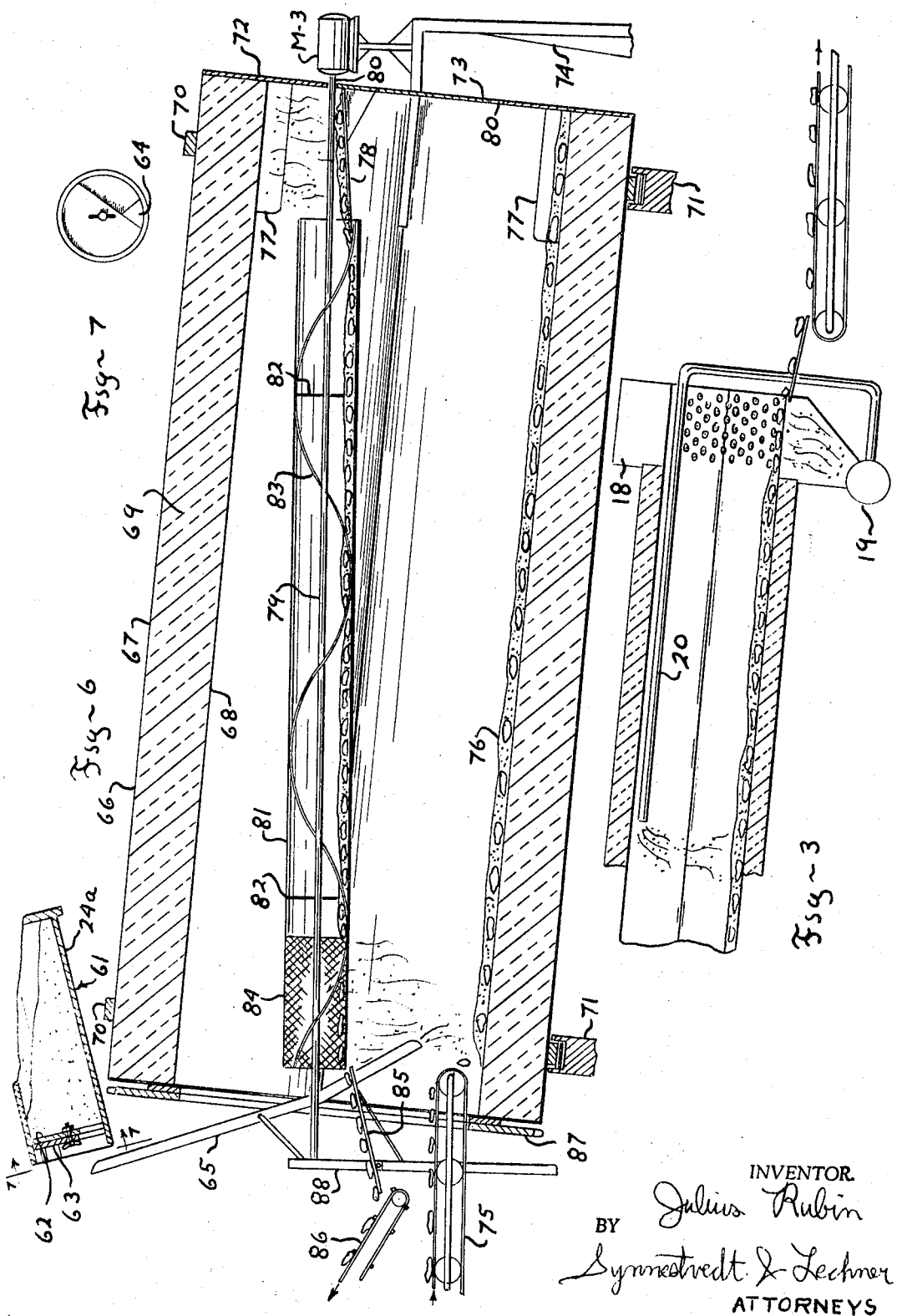

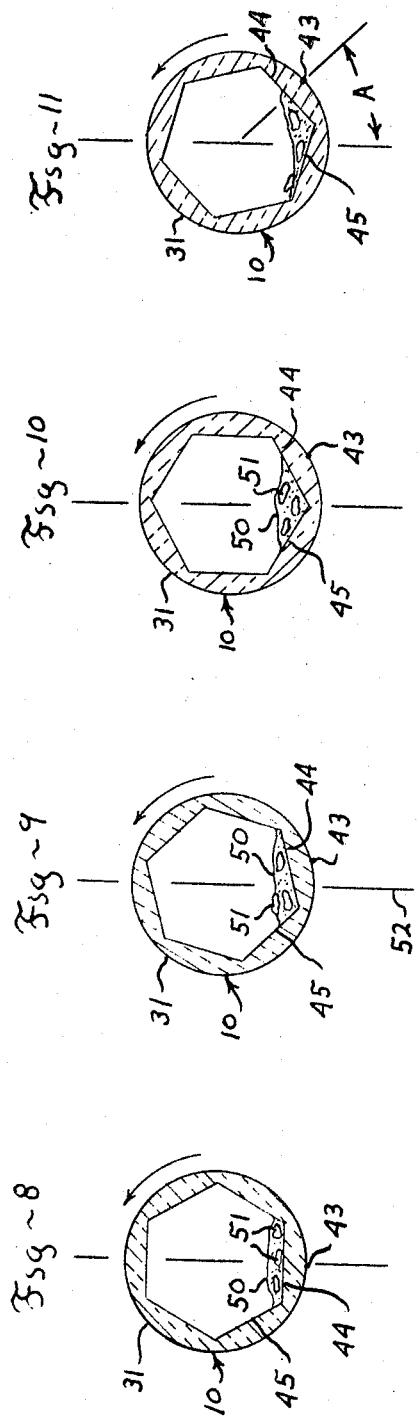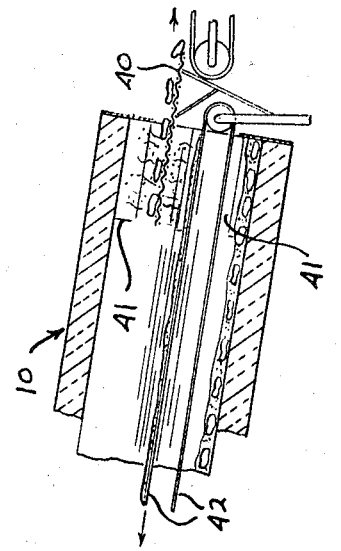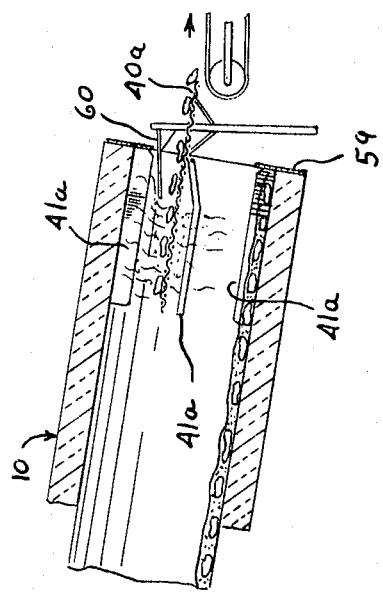

3,446,030
METHOD AND APPARATUS FOR QUICK FREEZING INDIVIDUAL FOOD ITEMS
Julius Rubin, Franklin Square, N.Y., assignor to Thermice Corporation, Philadelphia, Pa., a corporation of Pennsylvania
Filed Sept. 11, 1964, Ser. No. 395,649
Int. Cl. F25d *13/06, 3/02, 3/12*
U.S. Cl. 62—63                                    15 Claims This application relates to the freezing of food for storage purposes. It is particularly concerned with a method and apparatus for quick freezing individual or discrete items of food in such a manner that the items of food remain separate and separable from one another after being frozen, as distinguished from being frozen in a block or mass comprised of a number of items of food stuck together.

In order to successfully freeze a number of different kinds of food, it is necessary to do it quickly. One reason for this is that the size of ice crystals formed by the water in the food is related to the freezing time. The more quickly the freezing is accomplished, the smaller the ice crystals tend to be, and thus the less disruptive of the cellular structure of the food. Examples of foods which are quite sensitive to ice crystal size, and are thus important to freeze quickly, are tomato slices, strawberries and cherries.

Another factor which makes quick freezing imperative with some foods is that they contain fast acting enzymes which tend to very quickly alter the taste of the food. If the freezing is accomplished quickly enough, the action of these enzymes is arrested and the undesirable change in taste does not occur. A food which is desirably quick frozen because of its taste sensitivity is sweet corn.

It is desirable to freeze certain foods quickly because they are structurally fragile. By freezing items of such food rapidly, a strong frozen outer layer is quickly created which enables the food item to withstand further handling and processing despite its inherently fragile nature. Examples of food of this kind include ripe peeled bananas and onion rings.

A common technique of freezing food involves freezing it in packages in which the several items of food which make up the package are frozen or stuck together. Even if the user wishes to cook or serve only part of the food in the package he must thaw the entire package in order to separate the portion he wishes to use from the remainder. The remaining food cannot successfully be refrozen and must thus be used relatively quickly. It is much more convenient for the user if the food is frozen in such a manner that when it is packaged the individual items remain separate or easily separable. If the freezing is performed so that this result is accomplished, the user can then separate out that portion of the package which he wishes to use without thawing the remainder.

A technique for freezing individual items of food in a way so that they will not stick to each other is to quick freeze them. Thus quick freezing is a desirable technique even for many classes of food which are not necessarily ruined by being frozen relatively slowly.

One further problem which has inconvenienced the freezing art is that many of the procedures used heretofore are essentially batch operations and involve the use of hard to handle supplementary equipment such as freezing trays or boxes.

In accordance with the present invention an improved method and apparatus are provided for quick freezing food while maintaining the separateness of the individual items. The invention is most advantageously practiced with a powdered refrigerant such as granulated dry ice or dry ice snow, although certain aspects of the invention are useful with liquid refrigerants.

It is an object of the present invention to provide an improved method and apparatus for quick freezing individual or discrete items of food.

Another object of the invention is the provision of a method and apparatus for quick freezing food by utilizing the latent heat of vaporization of powdered dry ice.

A further object of the present invention is the provision of a method and apparatus for quick freezing food which is readily adapted to continuous operation, and which can readily be incorporated into a continuously operated food processing installation.

Another object of the invention is the provision of a method and apparatus for quick freezing food which is capable of successfully freezing even very fragile foods.

The above objects together with other objects and purposes can be more readily understood by considering the following detailed description together with the accompanying drawings in which.

Figure 2:
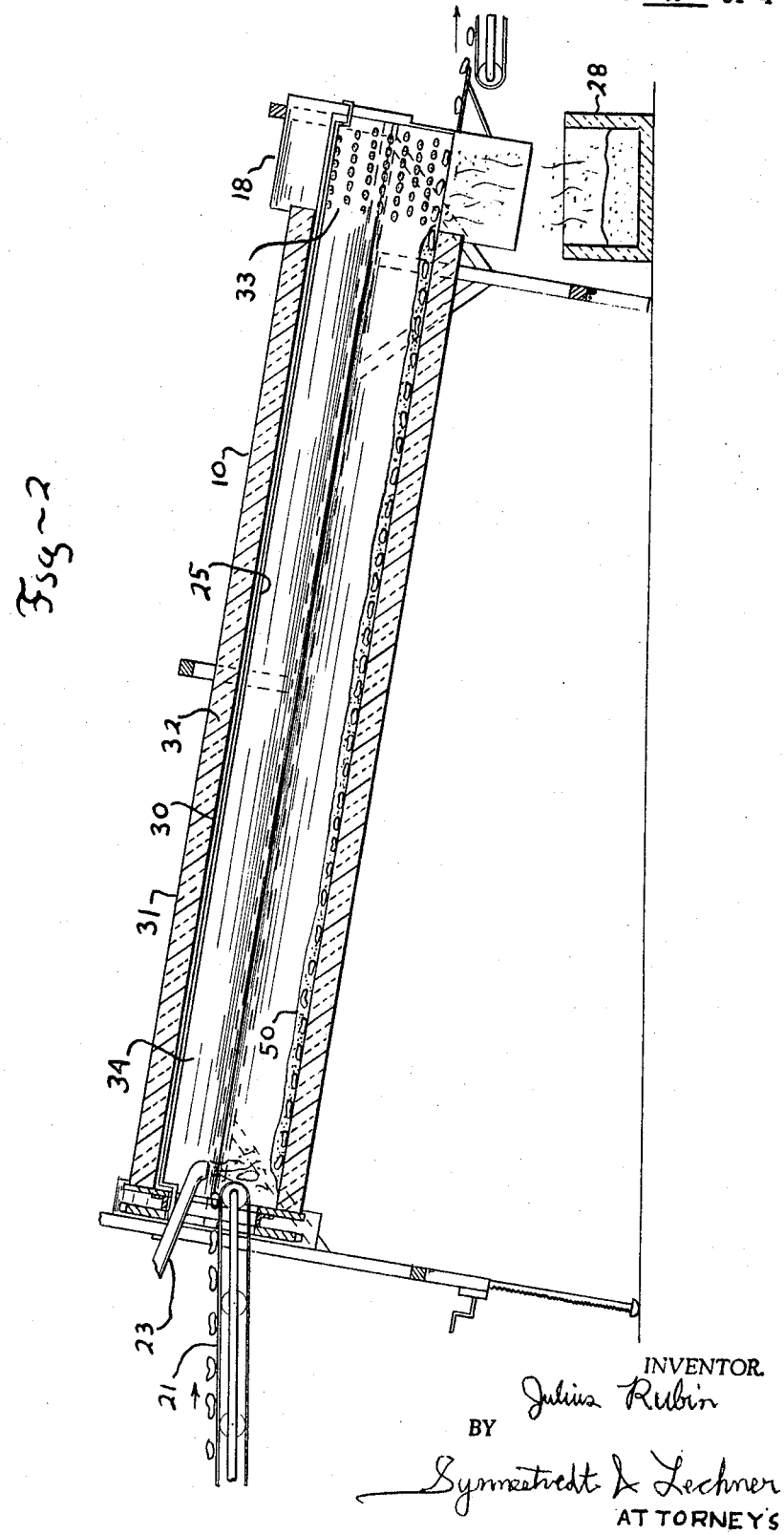
FIGURE 2 is a vertical sectional elevational view of a portion of the freezing apparatus of FIGURE 1 with some parts omitted for the sake of simplicity.

FIGURES 3, 4, and 5 are fragmentary sectional elevational views similar to FIGURE 2 showing other constructions of the portion of the apparatus used for separating and recycling the refrigerant;

FIGURE 6 is a vertical sectional elevational view of another embodiment of the invention, with some parts omitted for the sake of simplicity;

FIGURE 7 is a fragmentary elevational view taken on line 7—7 of FIGURE 6; and

Figure 1:
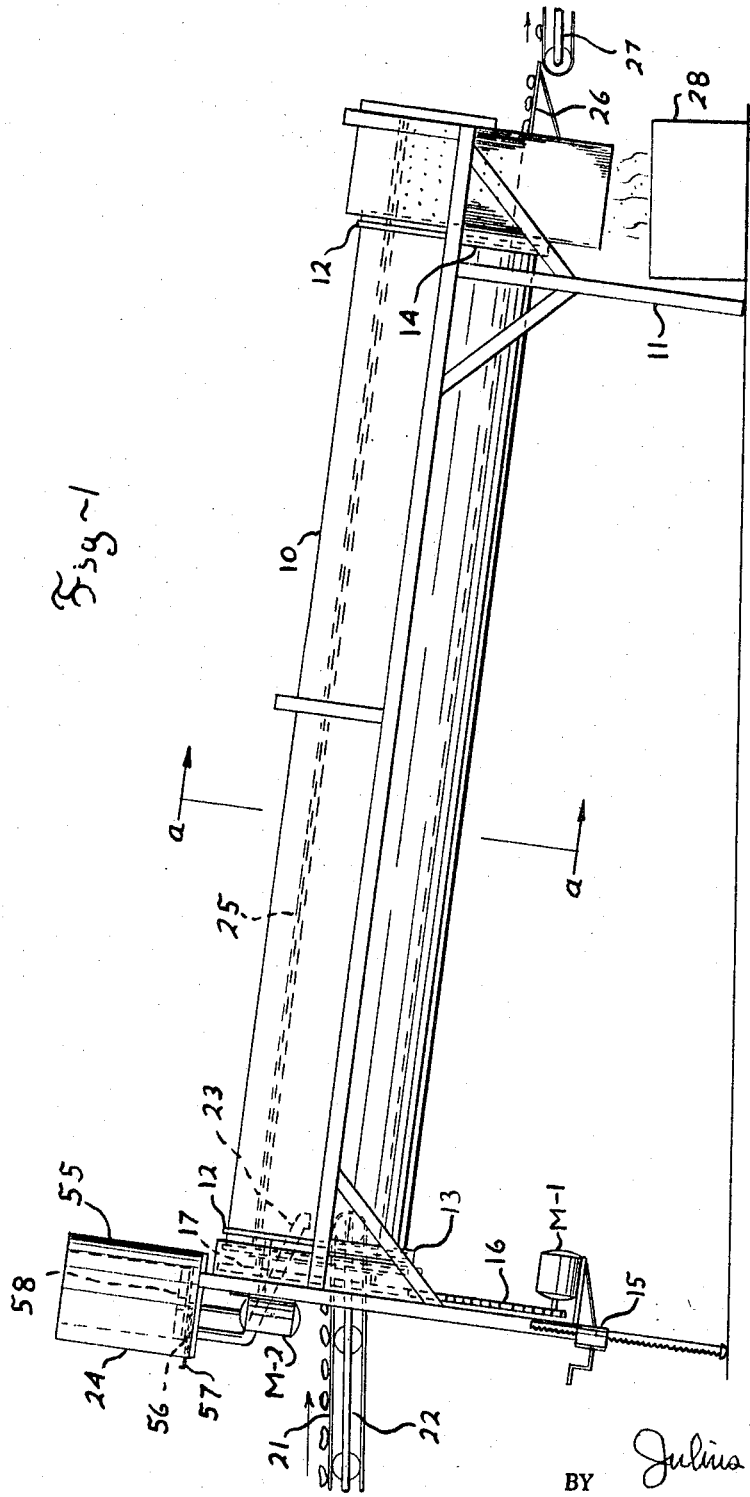
FIGURE 1 is a side elevational view of a freezing apparatus constructed in accordance with the invention.

FIGURES 8 through 11 are a series of somewhat diagrammatic cross sectional views taken on the line *a—a* of FIGURE 1 showing successive stages in the freezing operation performed in accordance with the invention.

I have discovered that the effectiveness of dry ice as a freezing agent for food items larger than powdered food is greatly increased if the dry ice is in granulated or powdered form and is brought into intimate contact with the food items for a short period of time following which the intimate contact is disrupted somewhat. The sequence of bringing the powdered dry ice into intimate contact with the food items and then disrupting the contact is desirably repeated over and over until the food items are frozen. By repeatedly uncovering the food items or otherwise disrupting the contact between them and the dry ice, one dissipates the thin layer of carbon dioxide gas which tends to form at the interface between the powdered dry ice and each of the food items. It is important to dissipate the gas layer because, although the gas is cold, it has a relatively low coefficient of heat transfer, and operates as an insulating barrier between the food item and the solid carbon dioxide. The carbon dioxide gas layer forms inexorably as the result of the flow of heat from the items of food into the solid carbon dioxide or the dry ice granules to supply the latent heat of vaporization for the carbon dioxide.

The procedure outlined above for radically increasing the effectiveness of the powdered refrigerant can be performed in a number of different ways, but the preferred way is to intermix the food items with the dry ice and tumble them with the powdered dry ice until the food items are frozen. The preferred procedure of tumbling can itself be performed in several ways. When it is done, for example, in apparatus constructed according to the invention the tumbling results in the establishment of a bed of powdered dry ice having items of food on and in it, and in the repeated folding or overturning of the bed of dry ice and food to repeatedly cover and uncover the food with dry ice.

Attention is directed to FIGURE 1 which shows a preferred form of the equipment. The tumbler 10 is mounted for rotation on frame 11 by means of bearing bands 12 which ride in cradles 13 and 14 of the frame 11. The frame 11 is provided with jack 15 which is mounted on the legs of the frame below the entrance end of the unit. By varying the setting of the jack it is possible to tilt the tumbler somewhat, and to vary the angle of tilt for reasons which will appear later. The tumbler is rotated on the cradles 13 and 14 by motor M–1 which drives through a chain 16 and circumferential sprocket 17.

At the low end of the tumbler 10 there is mounted a shroud 18 which surrounds the end of the tumbler, but does not rotate with it.

The input end of the tumbler is at the left as shown in FIGURE 1. The input equipment includes a food conveyor 21 mounted on frame 22 and a dry ice chute 23. The chute is fed by means of a granulated dry ice feeder 24, which is mounted on frame 11 above the entrance end of the tumbler 10. As can be seen in FIGURE 1 the feeder 24 comprises a small generally upright barrel 55 which has a feed hole 56 in the bottom thereof. An adjustable feed valve in the form of a thin strip 57 of metal slidably mounted at the bottom of the barrel adjacent hole 56 provides for varying the size of the hole to vary the feed rate.

The feeder is provided with a stirrer 58 driven by motor M–2. The stirrer is rotated slowly to prevent the granulated dry ice inside the feeder from packing and bridging, since such packing would disrupt the metered flow of dry ice through hole 56 into chute 23. It should be pointed out here that the dry ice feeder illustrated and described in connection with FIGURES 6 and 7 can also be utilized in an apparatus of the kind illustrated in FIGURES 1 and 2, and that the feeder of FIGURE 1 can be used with the unit shown in FIGURE 6.

A scraper 25 is mounted on the frame 11 so that it extends into the tumbler 10 near the top thereof. In the unit shown in FIGURES 1 and 2, the scraper extends through the full length of the tumbler, and it is attached to the frame at both ends. In other embodiments, for example, in the embodiments shown in FIGURES 3, 4, and 5, the special equipment provided at the exit end of the tumbler makes it desirable to terminate the scraper short of the exit end. In such a case the scraper it attached to frame 11 at the entrance end only and is cantilevered into the tumbler for a desired distance, such as several feet.

At the output end of the tumbler 10 is a food chute 26 which guides food leaving the tumbler onto take-away conveyor 27.

The structure of the tumbler 10 can best be understood by a study of FIGURE 2. The tumbler has a liner 30. The liner is configured so that the passage through the tumbler is of preselected shape. One shape which has proved quite practical is that of polygons having moderate numbers of sides such as hexagons or octagons. For some food items closed curve shapes such as ellipses are useful. Furthermore, passages of circular cross section are also useful with some kinds of food items. The liner 30 should be constructed of a material with which food can safely be contacted and which can withstand the cold environment prevailing within the tumbler without being harmed. Stainless steel has been found to meet these requirements very well. While it is possible to provide the liner 30 with baffles and other elements for increasing the tumbling action, it is generally preferred that such baffles not be employed except immediately adjacent the ends of the tumbler. One reason for this preference is that a tumbler having an uncluttered interior is more sanitary and easier to clean.

The space between the outer cylindrical shell 31 of the tumbler 10 and the inner liner 30 is desirably filled with an insulating material such as polyurethane foam indicated at 32.

FIGURE 2 also illustrates the mode of cooperation between the various pieces of equipment shown on FIGURE 1. From FIGURE 2 it can be seen that the food conveyor 21 extends into the entrance end of the tumbler passage so that it will deliver items of food into the tumbler passage and deposit them in the bed of dry ice established therein. FIGURE 2 also shows that the dry ice chute 23 is mounted so that it will deliver dry ice into the entrance end of the tumbler passage concurrently with the food items and thereby continually establish the rearmost portion of the bed of powdered dry ice which is maintained within the tumbler.

As will be explained in fuller detail below, almost all of the powdered dry ice remains in a food freezing bed 50 in the lower portion of the tumbler during operations. Throughout most of the length of the tumbler, there is little or no tendency for the dry ice powder to stick to the liner and thus be carried into the upper portion of the tumbler during rotation thereof. However, the entrance end of the tumbler is relatively warmer and the atmosphere in this region is relatively more humid than in the rest of the tumbler; thus, such sticking of dry ice as does occur tends to be concentrated near the entrance end of the tumbler, as does formation of water ice on the walls of the tumbler. The purpose of the scraper 25 is to knock down dry ice and water ice which occasionally sticks to the liner 30 and is carried to the top of the tumbler passage. When the tumbler passage is polygonal in cross section, such as the hexagonal passage shown in FIGURE 8, the scraper 25 is desirably spaced from the axis of the passage a distance approximately equal to the minor radius of the polygon. In this way the scraper contacts each side of the liner 30 once during each revolution.

Another step which is desirably taken to eliminate sticking of dry ice or product in the vicinity of the entrance end of the tumbler is to provide that part of the liner 30 with a coating or lining of polytetrafluoroethylene (Teflon). In FIGURE 2 the special lining 34 of Teflon is shown extending from the entrance end to a point several feet downstream in the tumbler.

The powdered dry ice may be supplied to the tumbler in one of two principal forms. One form is commonly termed "granulated dry ice." Granulated dry ice is formed by pulverizing blocks of dry ice with a standard type of dry ice pulverizing unit such as a shaver. The particles so formed are desirably of 30 to 40 mesh. It is preferred that large particles be avoided since they do not as readily come into close contact with the food items and by reason of their size are not as readily separated from the food items. Granulated dry ice is convenient for many food freezing installations operated in accordance with the invention because it can be procured and stored in readily handled block or cake form and pulverized on site as needed in the operations. When granulated dry ice is used, it is metered into the tumbler by means of the slowly rotating dry ice feeder 24. The other common form of powdered dry ice is termed "dry ice snow." The snow is formed by flashing liquid carbon dioxide through a pressure reducing nozzle or orifice to produce a phase change from liquid carbon dioxide at high pressure to solid carbon dioxide in the form of snow and carbon dioxide gas. In installations constructed and operated according to the invention utilizing dry ice snow, the snow may be formed right in the tumbler 10 by piping liquid carbon dioxide to an orifice positioned just inside the entrance end of the tumbler.

The carbon dioxide gas which is evolved within the tumbler during freezing operations escapes therefrom through both the entrance end and exist end. It presents no serious problem in a well ventilated room.

FIGURES 2 through 5 show various forms of recycle equipment for returning the excess portion of the dry ice from the exist end of the tumbler back into the tumbler. The recycle operation can also be performed in other ways. In the embodiment shown in FIGURE 2, the tumbler passage is provided at the exit end thereof with a screen wall 33. The size of the screen grid is such that the dry ice powder will tend to fall through the screen, whereas the items of food will not. In this way a separation between the two can be effected. A shroud 18 is preferably mounted around the end portion of the tumbler which has a screen wall to collect the dry ice which passes out of the tumbler through the screen. The dry ice collected in shroud 18 falls through the open bottom of the shroud into the collecting barrel 28. The ice so collected in barrel 28 is returned at convenient intervals to the dry ice feeder 24.

The modification shown in FIGURE 3 is similar to that of FIGURE 2, but the shroud 18 is closed at the bottom and a blower 19 is mounted on the bottom of the shroud. The blower 19 provides for continuous recycle by blowing the collected dry ice which is in the shroud through the dry ice conveying line or return line 20 which extends back in the tumbler passage. It is preferred that the conveying line 20 extend into the tumbler far enough that the recycled dry ice is blown to a point about half way from the end of the tumbler.

A somewhat different recycle arrangement is shown in FIGURE 4. The screen separator means are again utilized, but the arrangement of the separator is changed. A screen 40 is mounted at the exit end of the tumbler so that it extends into the passage. At the end of the passage a set of baffles 41 are provided; one such baffle is mounted at each angle of the polygonal passage. As can be seen in FIGURE 4, the baffles are flat plates extending into the passage. As the tumbler is rotated, the baffles 41 will pick up a segment of the food containing bed of dry ice and lift it to a point somewhat above screen 40. When the segment of the bed has been lifted to this point, it slides off the baffle 41 and onto screen 40. The powdered dry ice passes downwardly through the screen 40, while the items of food do not. In order to make the separation even more effective, conventional power operated means can be provided for shaking the screen 40. The food slides down the slightly tilted screen 40 onto the take-away conveyor 27. The dry ice which as fallen through the screen 40 lands on and is collected on recycle conveyor 42. The recycle conveyor 42 is cantilever mounted so that it extends back upstream in the passage above the bed of food containing powdered dry ice. The conveyor ends at a preselected point within the tumbler and spills the recycle dry ice downwardly onto the bed of dry ice maintained within the tumbler.

The equipment shown in FIGURE 5 is similar to that of FIGURE 4, but the tumbler is generally cylindrical in cross section. Baffles are once again employed at the exist end of the tumbler. In FIGURE 5 they are designated 41a. It can be seen from that figure that the baffles are somewhat longer than in the embodiment of FIGURE 4 and that the downstream sections of the baffle are curved across the surface of the tumbler somewhat. Food and dry ice approaching the end of the unit is prevented from flowing out by the barrier plate or end plate 59. Instead, it is lifted by baffles 41a. The baffles lift the food and dry ice to a level somewhat above screen 40a and the chute 60. The food and dry ice slide off the baffle and, depending upon its proximity to the end of the tumbler, on to chute 60 or screen 40a. The food and ice which fall on 60 slide off it onto screen 40a. The dry ice falls through screen 40a on to the tumbler liner 30. The curved sections of the baffles 41a tend to cause the dry ice to migrate back upstream in the tumbler somewhat. The food leaves the tumbler on screen 40a.

The embodiments of the recycle equipment of the invention which have been discussed in connection with FIGURES 3, 4, and 5 provide for what amounts to counter-current recycle feed. If desired, they can be modified to provide for concurrent recycle feed by arranging the recycle conveying means to enter the entrance end of the tumbler or to deposit the dry ice at the entrance end, for example, on chute 23. In general, it is desirable to deposit the recycle dry ice at a point about midway through the tumbler, because experience has shown that this is the region in which the powered dry ice which makes up the freezing bed 50 begins to thin out in the absence of recycle.

Attention can now be turned to the embodiment of the invention shown in FIGURES 6 and 7. As mentioned earlier the dry ice feeder shown in these FIGURES can be used not only with the unit shown in FIGURES 6 but with units of the kind shown in FIGURE 1. The dry ice dispenser 24a in FIGURE 6 is generally barrel shaped, the barrel 61 being mounted for rotation by a motor (not shown) at an angle to the horizontal. The low end of barrel 61 is formed of two segments 62 and 63, the relative angular positions of which can be varied to provide a feeding opening 64 (see FIGURE 7) of selected size. By varying the size of this opening it is possible to vary the feed rate of granulated dry ice. The barrel 61 is rotated slowly in operation, and the dry ice falls through the opening 64 on to chute 65 at a pre-selected rate.

The apparatus of FIGURE 6 incorporates many of the features of the apparatus discussed earlier in connection with FIGURES 1 and 2, but differs from that apparatus in that the frozen food is delivered from it at the same end of the tumbler as the unfrozen food is fed to it. In such an arrangement, the end of the tumbler opposite the input end can be substantially closed. This is an advantage because it reduces the number of flow paths for heat to enter the unit. Other advantages of this type of unit include a simplified recycle and a more complete utilization of the cold volume of the tumbler. In FIGURE 6 it can be seen that the tumbler 66 has an outer shell 67 which is separated from the inner liner 68 by insulating material 69. The tumbler 66 is mounted by means of bearing bands 70 for rotation on cradles 71. The liner 68 is hexagonal in cross section like the liner 30 in FIGURE 2. The tumbler, at its right-hand end as viewed in FIGURE 6, is prodivided with an end ring 72, which is fastened to the end of the tumbler for rotation therewith. The hole in the end of the tumbler defined by the inner edge of the end ring 72 is closed, for the most part, by end disc 73 which is fixed to frame member 74 and does not rotate with the tumbler. (A narrow circular slot 80 is established by the disc and ring.) An input conveyor 75 is positioned to feed food items into the left-hand end of the tumbler on to the bed of dry ice which established there by the dry ice flowing down chute 65. The bed of dry ice 76 with food items therein, is substantially similar in configuration and function to the bed of dry ice 50 shown in FIGURE 2.

Baffles 77 are mounted at the angles of the polygonal liner 68 at the right-hand end thereof in a position to pick up the portion of the dry ice bed and the food contained therein which reaches the right-hand end of the tumbler. The food so picked up is deposited on chute 78 which is cantilevered into the right-hand end of the assembly from end disc 73.

A motor M-3 is mounted on frame 74. It is connected to a shaft 79 which extends through the circular slot 80, defined by disc 73 and ring 72, to the left-hand end of the tumbler 66 where it is journaled to frame member 88. Shaft 79 carries return tube 81 which is mounted on it by means of spiders 82. As can be seen from FIGURE 6 the return tube 81 is generally horizontally mounted although it may be given a slight pitch upwardly or downwardly. It is so positioned within tumbler 66 that it receives food and dry ice from chute 78 at the right-hand end of the tumbler. Inside the return tube 81 is a generally helical feed blade 83 which is mounted to rotate with the tube. The wall of the tube 81 at the left-hand end is of screen configuration as shown at 84. A chute 85 is mounted on frame 88 and extends into the end of tumbler 66 to a point where it can receive food issuing from the end of return tube 81. The chute 85 delivers the frozen food items to take-away conveyor 86.

The operation of the apparatus of FIGURE 6 is generally as follows. Tumbler 66 is rotated by a chain drive which includes sprocket 87. Dry ice is fed into the left-hand end of the unit on chute 65 and food is fed in on conveyor 75. The food and dry ice travel in a bed 76 through the tumbler to the right-hand end where they are picked up, and placed on chute 78 which feeds them into return tube 81. This tube is slowly rotated by means of motor M-3 and the dry ice and food pass to the left through tube 81, being assisted in their movement by blade 83. The unconsumed dry ice which approaches the left-hand end of return tube 81 falls through the screen wall thereof on to the rightwardly moving bed of dry ice 76. In this manner a very simple recycle of the dry ice is accomplished. The items of frozen food which have been thus separated from the dry ice fall out of the end of tube 81 on to chute 85 and ultimately take-away conveyor 86.

The operation of the equipment having the preferred polygonal tumbler cross section can best be understood by considering FIGURES 8 to 11 which show somewhat diagrammatically successive stages during part of one rotation of the tumbler 10. The operation of assemblies having other cross sections is generally similar. As an aid in following the operation, an index mark 43 is made on the outer casing 31 of the tumbler. By comparing the relative positions of the index mark, one can appreciate that the tumbler 10 has been rotated counter-clockwise through an angle A between FIGURES 8 and 11.

As can be seen in these figures, the passage of the tumbler 10 is hexagonal in shape and the liner 30 has six flat sides. The two sides of the liner which are most important the following description are marked 44 and 45.

During the rotation of the tumbler, a bed of dry ice, containing on and in it discrete items of food, is established within the tumbler. The bed is indicated in FIGURE 8 by the reference character 50. In that figure the bed consists of a layer of powdered dry ice spread out over the side 44, and having within it several items of food 51.

In FIGURE 9, the tumbler has been rotated somewhat so that side 44 is no longer horizontal. The bed of dry ice and the food items, under the influence of gravity, tend to seek out the lowest portion of the tumbler. Because of this, the dry ice and food tend to slide toward the center line 52. The food items tend to slide toward the center line 52 more readily than does the dry ice. Stated differently, the dry ice tends to be carried upwardly by the tumbler further than the food items are carried. As a consequence, the structure of the bed is disrupted, as compared with the situation existing in FIGURE 8, and the items of food become more or less uncovered.

FIGURE 10 shows the next step in the sequence. The operation of folding the bed upon itself has been completed, and the bed, with a new structure, lies at the apex between sides 44 and 45. The items of food 51 are again recovered by the bed of powdered dry ice, but the gas layer tending to insulate the food from the dry ice has been dissipated during the overturning or disrupting or folding operation in which the food items were momentarily uncovered.

As the tumbler continues to rotate the stage shown in FIGURE 11 is created. Once again, bed 50 is shown being disrupted as the dry ice and items of food move toward the center line 52 under the influence of gravity with different facility. Again, the dry ice tends to be carried upwardly by the tumbler wall to a greater extent than do the items of food. The situation shown in FIGURE 11 is part way through a folding operation at the end of which the bed will have the structure shown in FIGURE 8 again.

To summarize, the operation performed by the tumbler is that of repeatedly transversely overturning the bed of dry ice, containing on it and in it items of food, the bed repeatedly being shifted from the configuration of FIGURE 8 to the configuration of FIGURE 10 and back again.

Considerable variation in the process variables and in the dimensions of the equipment is possible without departing from the scope of the invention. Certain preferences can be given, however. Experience has indicated that a dwell time within the tumbler of about three minutes is desirable for quick freezing most foods and for bringing them down to a target temperature of about 0° F. With a given tumbler, an increase in the tilt of the tumbler will tend to decrease the dwell time of the food therein, since the food will slide through the tumbler under the influence of gravity more readily. Some foods slide more easily than others, and it has been found that the pitch of the tumbler is the variable most conveniently modified to accommodate differences in the sliding character of the food. For most operations, with a tumbler of about 10 feet long, and 1 foot in diameter turning at 10 r.p.m. the pitch will be between about 15° and 20° for a nominal dwell time of three minutes.

The speed of rotation of the tumbler can be varied within wide limits. A very satisfactory speed of rotation is in the neighborhood of 10 r.p.m. An increase in the speed of rotation, within limits will tend to decrease the dwell time within the tumbler and to decrease the dwell time necessary to reach a preselected target temperature, since the freezing bed will be folded more often in a unit of time. However, with some foods high speed rotation may tend to damage the food before the protective frozen outer layer is completely formed, and, if the speed of rotation is increased too much, the effectiveness of the overturning of the bed will actually be decreased because of the effect of centrifugal force holding the dry ice and food against the wall throughout a complete rotation.

The length and diameter of the tumbler can be varied considerably. In general, an increase in the length will permit a larger throughput for the same dwell time. The diameter should be selected so that the sides of the polygon establish a freezing bed of convenient width for the type of food to be handled. For a wide variety of foods, a unit arranged in accordance with FIGURE 1 having a tumbler length of about 10 feet and a diameter of one foot has resulted in a unit with a nominal throughput of 1,000 lbs. per hour with a dwell time of three minutes.

In the preferred operation, the apparatus should be run with an excess of dry ice. In general, it is desirable to maintain in the tumbler about two to three times the amount of dry ice theoretically necessary to freeze the food in the tumbler at any given time to the desired temperature. Only the latent heat of vaporization of dry ice should be taken into account for design considerations, since the sensible heat of carbon dioxide gas formed during tumbling makes only a minor contribution to the freezing. It has been found that if the input rates of food and powdered dry ice are adjusted so that about ¾ to 1 lb. of dry ice is fed for every pound of food, and at the same time substantially all of the dry ice appearing at the exit end of the tumbler is recycled, the foregoing preferred condition will be maintained.

I claim:
1. Apparatus for freezing a multiplicity of discrete food items comprising, a tumbler having therein an elongated flow passage of polygonal cross section, means for introducing food items and particles of solid carbon dioxide into an entrance end of said flow passage, drive means for rotating the tumbler on an axis parallel to said flow passage, said tumbler being disposed at an angle with the horizontal with said entrance end higher than the other end so that the items and particles fed into said entrance end will, during rotation of the tumbler, travel down the flow passage under the force of gravity, a plurality of generally axially disposed baffles mounted in spaced relation around the inside of said tumbler adjacent said other end thereof in position to extend generally radially into the flow passage, each of said baffles providing for supporting and lifting a portion of said particles and food items as the baffle rotates with the tumbler from a position at the bottom of the flow passage toward a position above said bottom, and delivery means within the flow passage in the region of said baffles, said delivery means being positioned to receive particles and food items lifted by each baffle when that baffle rotates to a position in which said portion falls off of it, said delivery means providing for delivery of the food items so received away from said other end of the tumbler.

2. Apparatus for freezing a multiplicity of discrete food items comprising, a tumbler having an elongated flow passage therein, means for introducing food items and particles of solid carbon dioxide into an entrance end of said flow passage and for forming therein a bed of mixed items and particles, drive means for rotating the tumbler on an axis parallel to said flow passage, said tumbler being disposed at an angle to the horizontal with said entrance end higher than the other end so that the items and particles fed into said entrance end will, during rotation of the tumbler, travel down the flow passage under the force of gravity, the interaction of the wall of the flow passage with said items and particles during rotation of the tumbler effecting an intimate intermixing thereof and a repeated folding of the bed over on itself, return conveyor means mounted within the flow passage of the tumbler, said return conveyor means having an input end adjacent the lower end of the tumbler and an output end adjacent the upper end of the tumbler to convey the mixture of particles and food items from the lower end of the tumbler flow passage toward the higher end thereof, transfer means in the tumbler adjacent the closed end thereof for transferring the mixture from the lower end of the tumbler to the input end of the return conveyor means, and delivery means positioned at the output end of the conveyor means for delivering out of the unit the food items conveyed by the conveyor means to the output end thereof.

3. Apparatus for chilling a multiplicity of discrete food items comprising a tumbler having an elongated flow passage therein, means for introducing food items and particles of solid carbon dioxide into an entrance end of said flow passage and for forming therein a bed of mixed items and particles, said tumbler being disposed at an angle to the horizontal with said entrance end higher than the other end, drive means for rotating the tumbler on an axis parallel to said flow passage so that the items and particles fed into said entrance end will, during rotation of the tumbler, travel down the flow passage under the force of gravity and so that said bed will be repeatedly folded over on itself, means for separating particles of solid carbon dioxide from the food items toward the lower end of the flow passage, and means for feeding, in upstream direction, the particles of solid carbon dioxide separated from the food items by the separating means and for reintroducing said separated particles into the bed.

4. In the chilling of items of food by the use of carbon dioxide, the method of transferring heat from the food to solid carbon dioxide comprising forming a generally horizontal elongated moving bed of discrete items of said food by infeed thereof into an input region, translation thereof lengthwise of the bed along a supporting surface to an output region, and removal thereof from said output region, during at least a portion of said translation combining with said moving bed particles of solid carbon dioxide of size substantially smaller than the size of said discrete items of food to form a moving bed of intimately intermixed particles of solid carbon dioxide and discrete food items with the particles and items resting on each other in solid-to-solid contact, in which bed of intermixed particles and items a layer of carbon dioxide vapor tends to form on the surface of each food item as a barrier to the transfer of heat from the food item, and repeatedly dissipating such layer of carbon dioxide vapor by repeatedly disrupting and re-establishing said moving bed and thereby repeatedly re-establishing solid-to-solid contact between the particles of solid carbon dioxide and the discrete food items, said repeated disruption and re-establishment of the moving bed being accomplished by moving said supporting surface in direction generally transverse said lengthwise translation of the bed so as to effect an interaction of said supporting surface and the bed.

5. In the freezing of items of food by the use of carbon dioxide, the method of transferring heat from the food to solid carbon dioxide comprising forming a generally horizontal elongated moving bed of discrete items of said food by infeed thereof into an input region, translation thereof lengthwise of the bed to an output region, and removal thereof from said output region, during at least a portion of said translation combining with said moving bed particles of solid carbon dioxide of size substantially smaller than the size of said discrete items of food to form a moving bed of intimately intermixed particles of solid carbon dioxide and discrete food items with the particles and items resting on each other in solid-to-solid contact, in which bed of intermixed particles and items a layer of carbon dioxide vapor tends to form on the surface of each food item as a barrier to the transfer of heat from the food item, repeatedly dissipating such layer of carbon dioxide vapor by repeatedly disrupting and re-establishing said moving bed and thereby repeatedly re-establishing solid-to-solid contact between the particles of solid carbon dioxide and the discrete food items, and separating particles of solid carbon dioxide from the frozen food items in the output region and removing the frozen food items therefrom.

6. The method of freezing food pieces in a space bounded by wall surfaces, which method comprises initially coating a wall at the beginning of said space with solid phase carbon dioxide in particulate form, placing a plurality of individual pieces on the coated wall, applying more solid phase carbon dioxide in particulate form to the surfaces of the pieces on said wall, advancing pieces from an entrance end of the space and lengthwise of the space in intimate contact with the carbon dioxide and while the carbon dioxide sublimes as the result of heat absorbed from the food pieces, supplying an additional quantity of solid phase carbon dioxide in particulate form sufficient to freeze all of the pieces, and withdrawing the pieces in frozen condition from the opposite end of the space from said entrance end.

7. The method of freezing described in claim 6 characterized by tumbling the mixture of food pieces and carbon dioxide as they advance in said space to maintain intimate contact of the carbon dioxide and pieces, and supplying enough carbon dioxide to freeze the food pieces during the advancing of the mixture in the space and before sublimation of all of the carbon dioxide in each part of said mixture.

8. The method of freezing described in claim 7 characterized by rotating the space through which the mixture advances about the axis extending in the general direction in which the mixture advances and with a downward slope in the direction of advance so that the pieces are advanced by a gravitational force component.

9. Apparatus for chilling a multiplicity of discrete food items comprising, a tumbler having therein an elongated flow passage formed by a generally tubular wall member, feed means for introducing food items and particles of solid carbon dioxide, which particles are of small size in relation to the size of said food items, into said flow passage and for forming therein a bed of mixed items and particles, at least one end of said wall member being vented to provide for the escape of carbon dioxide vapor out of said flow passage, and drive means for rotating the tumbler on an axis parallel to and substantially central of said flow passage, said tumber being disposed at an angle to the horizontal so that the items and particles fed thereinto will, during rotation of the tumbler, travel down the flow passage under the force of gravity toward the lower end thereof, said flow passage wall member being substantially impervious to the passage of gas therethrough and being constructed and arranged so that the interaction of said wall member with said items and particles during each rotation of the tumbler effects a several times repeated folding of the bed over on itself, a several times repeated dissipation of carbon dioxide vapor from the food items, and a several times repeated restoration of said solid-to-solid contact.

10. Apparatus for chilling a multiplicity of discrete food items comprising, a tumbler having an elongated flow passage therein, feed means for introducing food items and particles of solid carbon dioxide, which particles are of small size in relation to the size of said food items, into said flow passage and for forming therein a bed of mixed items and particles, drive means for rotating the tumbler on an axis parallel to said flow passage, said tumbler being disposed at an angle to the horizontal so that the items and particles fed thereinto will, during rotation of the tumbler, travel down the flow passage under the force of gravity toward the lower end thereof, the interaction of the wall of the flow passage with said items and particles during rotation of the tumbler effecting an intimate intermixing thereof and a repeated folding of the bed over on itself, the lower end of said tumbler being open, separation means at the lower end of the flow passage for separating particles of solid carbon dioxide from the food items, said separation means comprising a screen separator device mounted at the open end, the screen separator having a screen of mesh providing for passage of said particles but preventing passage of said food items, and discharge means positioned to receive food items separated by the separation means and arranged to deliver same out of the unit.

11. Apparatus for chilling a multiplicity of discrete food items comprising, a tumbler having an elongated flow passage therein, feed means for introducing food items and particles of solid carbon dioxide, which particles are of small size in relation to the size of said food items, into said flow passage and for forming therein a bed of mixed items and particles, drive means for rotating the tumbler on an axis parallel to said flow passage, said tumbler being disposed at an angle to the horizontal so that the items and particles fed thereinto will, during rotation of the tumbler, travel down the flow passage under the force of gravity toward the lower end thereof, the interaction of the wall of the flow passage with said items and particles during rotation of the tumbler effecting an intimate intermixing thereof and a repeated folding of the bed over on itself, separation means at the lower end of the flow passage for separating particles of solid carbon dioxide from the food items, said separation means comprising a perforate portion of the wall of the tumbler at the lower end thereof, said perforate portion providing for passage of said particles but preventing passage of said food items, a collecting shroud positioned to collect the particles which pass through the perforate portion of the tumbler wall, and feed means for re-introducing the collected particles into the tumbler.

12. In the chilling of items of food by the use of carbon dioxide, the method of transferring heat from the food to solid carbon dioxide comprising forming a generally horizontal elongated moving bed of discrete items of said food by infeed thereof into an input region, translation thereof lengthwise of the bed to an output region, and removal thereof from said output region, during at least a portion of said translation combining with said moving bed particles of solid carbon dioxide of size substantially smaller than the size of said discrete items of food to form a moving bed of intimately intermixed particles of solid carbon dioxide and discrete food items with the particles and items resting on each other in solid-to-solid contact, in which bed of intermixed particles and items a layer of carbon dioxide vapor tends to form on the surface of each food item as a barrier to the transfer of heat from the food item, and repeatedly dissipating such layer of carbon dioxide vapor by repeatedly disrupting and re-establishing solid-to-solid contact between the particles of solid carbon dioxide and the discrete food items, in which method said moving bed of food items slides downwardly down an inclined path from said input region to said output region and is moved along said path by the force of gravity, and during the downward sliding repeatedly folding said bed transversely upon itself, thereby effecting said repeated disrupting of said moving bed.

13. In the chilling of items of food by the use of carbon dioxide, the method of transferring heat from the food to solid carbon dioxide comprising forming a generally horizontal elongated moving bed of discrete items of said food by infeed thereof into an input region, translation thereof lengthwise of the bed to an output region, and removal thereof from said output region, during at least a portion of said translation combining with said moving bed particles of solid carbon dioxide of size substantially smaller than the size of said discrete items of food to form a moving bed of intimately intermixed particles of solid carbon dioxide and discrete food items with the particles and items resting on each other in solid-to-solid contact, in which bed of intermixed particles and items a layer of carbon dioxide vapor tends to form on the surface of each food item as a barrier to the transfer of heat from the food item, and repeatedly dissipating such layer of carbon dioxide vapor by repeatedly disrupting and re-establishing solid-to-solid contact between the particles of solid carbon dioxide and the discrete food items, in which method the quantity of particles of solid carbon dioxide combined with the food items is in excess of the quantity required to accomplish the desired degree of chilling of the food items, and in which the excess carbon dioxide particles are separated from the food items in said output region and are re-cycled by being added to the moving bed of particles and items.

14. Apparatus for individually quick freezing of a plurality of pieces of food, including in combination a tumbling tube, said tube being open at both ends, means for supplying the pieces of food to the space within the tube at substantially atmospheric pressure, said means for supplying the pieces of food to the tube including a surface at one end of the tube independent of the tube and by which food pieces are supported before entering the tube and from which the food pieces are discharged into the tube, walls in the tube giving said space a non-circular cross-section transverse of a longitudinal axis of the tube, means for supplying solid phase carbon dioxide in particulate form to said space so that the food pieces are mixed with the carbon dioxide at the entrance end of the tube and within the tube, means for rotating the tube along its longitudinal axis to tumble the food pieces and the carbon dioxide and bearings on which the tube is rotatably supported within its longitudinal axis at a slope to the horizontal so that the food pieces and carbon dioxide are advanced along the length of the tube by gravity.

15. The apparatus described in claim 14 characterized by the means for supplying the pieces of food to the tube including a conveyor at the inlet end of the tube and part of which is said surface independent of the tube, and another conveyor at the outlet end of the tube and onto which pieces of frozen food are discharged from the lower end of the tube as said pieces drop out of the tube by gravity.

References Cited

UNITED STATES PATENTS 1,933,257 10/1933 Goosmann _____ 62—388 X
2,263,452 11/1941 Birdseye _____ 62—63

(Other references on following page)

UNITED STATES PATENTS

| | | | |
|---|---|---|---|
| 2,380,653 | 7/1945 | Kopplin | 51—282 |
| 2,422,709 | 6/1947 | Wiczer | 62—1 X |
| 2,682,732 | 7/1954 | Hanrahan | 62—64 |
| 2,881,571 | 4/1959 | Granata | 51—164 |
| 2,893,216 | 7/1959 | Seefeldt | 62—63 |
| 2,284,270 | 5/1942 | Eberts et al. | 99—193 |
| 916,290 | 3/1909 | Fleming. | |
| 3,097,501 | 7/1963 | Pappas | 62—63 |
| 3,213,634 | 10/1965 | Granata | 62—384 |
| 3,214,928 | 11/1965 | Oberdorfer | 62—63 |

EDWARD J. MICHAEL, *Primary Examiner.*

U.S. Cl. X.R.

62—384, 379